(12) United States Patent
Narita (10) Patent No.: US 12,455,706 B2
(45) Date of Patent: Oct. 28, 2025

(54) INFORMATION PROCESSING DEVICE HAVING OS-STANDARD GENERAL-PURPOSE PRINTING PROGRAM INSTALLED THEREON THAT ENABLES THE DEVICE TO NOTIFY USER OF CONNECTION ERROR WITH PRINTER

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/156,468

(22) Filed: Jan. 19, 2023

(65) Prior Publication Data

US 2023/0236776 A1    Jul. 27, 2023

(30) Foreign Application Priority Data

Jan. 27, 2022   (JP) .................................. 2022-010931

(51) Int. Cl.
  *G06F 3/12*   (2006.01)
  *H04N 1/00*   (2006.01)

(52) U.S. Cl.
  CPC ............ *G06F 3/121* (2013.01); *G06F 3/1228* (2013.01); *G06F 3/1232* (2013.01);
  (Continued)

(58) Field of Classification Search
  CPC ...... G06F 3/121; G06F 3/1228; G06F 3/1232; G06F 3/1234; G06F 3/1236; G06F 3/1256; G06F 3/1259; H04N 1/00472
  See application file for complete search history.

(56) References Cited

U.S. PATENT DOCUMENTS

| 6,477,589 B1 | 11/2002 | Suzuki et al. |
| 2007/0003308 A1* | 1/2007 | Kim ........................ G06F 3/121 |
| | | 399/81 |

(Continued)

FOREIGN PATENT DOCUMENTS

| JP | 2000-259545 A | 9/2000 |
| JP | 2013-098589 A | 5/2013 |

(Continued)

OTHER PUBLICATIONS

International Search Report and Written Opinion dated Apr. 11, 2023 of the International Searching Authority issued in the PCT application No. PCT/JP2023/001132 together with English translations.

*Primary Examiner* — Nicholas Pachol
(74) *Attorney, Agent, or Firm* — Scully, Scott, Murphy & Presser, PC (57) ABSTRACT

A non-transitory computer-readable storage medium stores a support program for an information processing device connectable to a printer. The information processing device includes: a display; a computer; and a memory. The memory stores an operating system in which a general-purpose printing program corresponding to the printer and supported by the support program is embedded. The general-purpose printing program is configured to manage data for displaying a print settings screen on the display. The support program, when executed by the computer, causes the information processing device to perform: when a connection error that a connection between the information processing device and the printer has failed is confirmed: generating; and transferring. The generating generates notification data indicating a notification content for notifying a user of the connection error. The transferring transfers the notification data to (Continued)

display the notification content based on the notification data on the print settings screen.

8 Claims, 7 Drawing Sheets

(52) U.S. Cl.
CPC .......... *G06F 3/1234* (2013.01); *G06F 3/1236* (2013.01); *G06F 3/1256* (2013.01); *G06F 3/1259* (2013.01); *H04N 1/00472* (2013.01); *G06F 3/1284* (2013.01)

(56) References Cited

U.S. PATENT DOCUMENTS

| | | | |
|---|---|---|---|
| 2016/0150104 A1* | 5/2016 | Wagatsuma | G06F 3/1205 358/1.15 |
| 2016/0283176 A1* | 9/2016 | Masuda | G06F 3/1203 |
| 2018/0267755 A1* | 9/2018 | Okazawa | G06F 3/121 |
| 2020/0249881 A1* | 8/2020 | Hosomizo | G06F 3/1205 |
| 2021/0034306 A1* | 2/2021 | Takeuchi | H04W 48/16 |
| 2021/0209429 A1* | 7/2021 | Kakitsuba | G06F 3/1254 |
| 2021/0216250 A1* | 7/2021 | Kunimatsu | G06F 3/1285 |
| 2021/0216254 A1* | 7/2021 | Hosomizo | G06F 3/1228 |
| 2021/0216256 A1* | 7/2021 | Hosomizo | G06F 3/1257 |
| 2021/0232350 A1* | 7/2021 | Kakitsuba | G06K 15/1868 |
| 2021/0307103 A1* | 9/2021 | Koizumi | H04W 76/19 |
| 2021/0377417 A1 | 12/2021 | Nishikawa | |
| 2022/0357902 A1 | 11/2022 | Sato | |

FOREIGN PATENT DOCUMENTS

| | | |
|---|---|---|
| JP | 2015-106263 A | 6/2015 |
| JP | 2021-093081 A | 6/2021 |
| JP | 2021-121898 A | 8/2021 |
| JP | 2021-135666 A | 9/2021 |
| JP | 2021-189789 A | 12/2021 |

* cited by examiner

INFORMATION PROCESSING DEVICE HAVING OS-STANDARD GENERAL-PURPOSE PRINTING PROGRAM INSTALLED THEREON THAT ENABLES THE DEVICE TO NOTIFY USER OF CONNECTION ERROR WITH PRINTER

REFERENCE TO RELATED APPLICATIONS

This application claims priority from Japanese Patent Application No. 2022-010931 filed on Jan. 27, 2022. The entire content of the priority application is incorporated herein by reference.

BACKGROUND ART

Conventional configurations that use a printer driver to notify the user of the connection status with a printer are well known in the art. For example, an information processing device disclosed in Japanese Patent Application Publication No. 2021-135666 is provided with a printer diagnosis and correction unit, and a printer driver. When a print command is received from a printing application program, the printer driver generates a print job and instructs the printer diagnosis and correction unit to check whether any problems exist. When a problem exists, the printer diagnosis and correction unit displays information related to the problem. One problem described in the document described above is that the printer is offline.

DESCRIPTION

In recent years, practical technologies have been developed for controlling printers without the use of a printer driver. One such technology utilizes a general-purpose printing program that is embedded in the operating system (abbreviated "OS") as standard. With this technology, the OS, upon detecting a printer, associates the printer with the OS-standard general-purpose printing program. Thereafter, when a print command is received for that printer, the OS-standard general-purpose printing program can control printing without the need of a printer driver.

However, none of the conventional information processing devices that use an OS-standard general-purpose printing program have a configuration for notifying the user of the connection status with a printer before a print command is issued. The printer driver disclosed in the document described above provides problem-related information to the user when a print command is issued and, hence, the user cannot learn that a printer is offline prior to inputting the print command. Since the user may issue a print command without knowing that a connection error with the printer has occurred, the conventional technology has room for improvement.

In order to attain the above and other object, according to one aspect, the present disclosure provides a non-transitory computer-readable storage medium storing a support program for an information processing device connectable to a printer. The information processing device includes: a display; a computer; and a memory. The memory stores an operating system in which a general-purpose printing program corresponding to the printer is embedded. The general-purpose printing program is configured to manage data for displaying a print settings screen on the display. The support program supports the general-purpose printing program. The support program, when executed by the computer, causes the information processing device to perform: when a request to perform a process is issued from the general-purpose printing program in response to the printer being selected: (a) confirming. The (a) confirming confirms whether a connection is established between the information processing device and the printer. The support program, when executed by the computer, causes the information processing device to perform: when a connection error that the connection has failed is confirmed in the (a) confirming: (b) generating; and (c) transferring. The (b) generating generates first notification data indicating a first notification content for notifying a user of the connection error. The (c) transferring transfers the first notification data generated in the (b) generating to display the first notification content based on the first notification data on the print settings screen displayed on the display.

The support program described in the present specification checks the connection with the printer when a printer is selected via the general-purpose printing program and passes notification data to the general-purpose printing program to be displayed in a print settings screen when a connection error is confirmed. This enables the user to learn the connection status with a printer prior to inputting a print command on an information processing device that uses an OS-standard general-purpose printing program.

According to another aspect, the present disclosure also provides a non-transitory computer-readable storage medium storing a support program for an information processing device connectable to a printer. The information processing device includes: a display; a computer; and a memory. The memory stores an operating system in which a general-purpose printing program corresponding to the printer is embedded. The support program supports the general-purpose printing program. The support program, when executed by the computer, causes the information processing device to perform: when a request to perform a process is issued from the general-purpose printing program in response to the print being selected: (a) confirming. The (a) confirming confirms whether a connection is established between the information processing device and the printer. The support program, when executed by the computer, causes the information processing device to perform: when a connection error that the connection has failed is confirmed in the (a) confirming: (b) generating; and (c) displaying. The (b) generating generates notification data indicates a notification content for notifying a user of the connection error. The (c) displaying on the display a popup window based on the first notification data generated in the (b) generating.

A printing system that includes an information processing device on which the support program is installed, a computer-readable storage medium for storing the support program, a control method for implementing the functions of the support program, the support program, and a printer are all novel and useful.

The present specification describes a technology employed on an information processing device having an OS-standard general-purpose printing program installed thereon that enables the device to notify the user when a connection error with a printer has occurred before the user issues a print command.

Below, a personal computer (hereinafter referred to as "PC") 1 using a support program according to the present embodiment will be described while referring to the accompanying drawings. This specification describes the support program executed by the PC 1.

Figure 1:
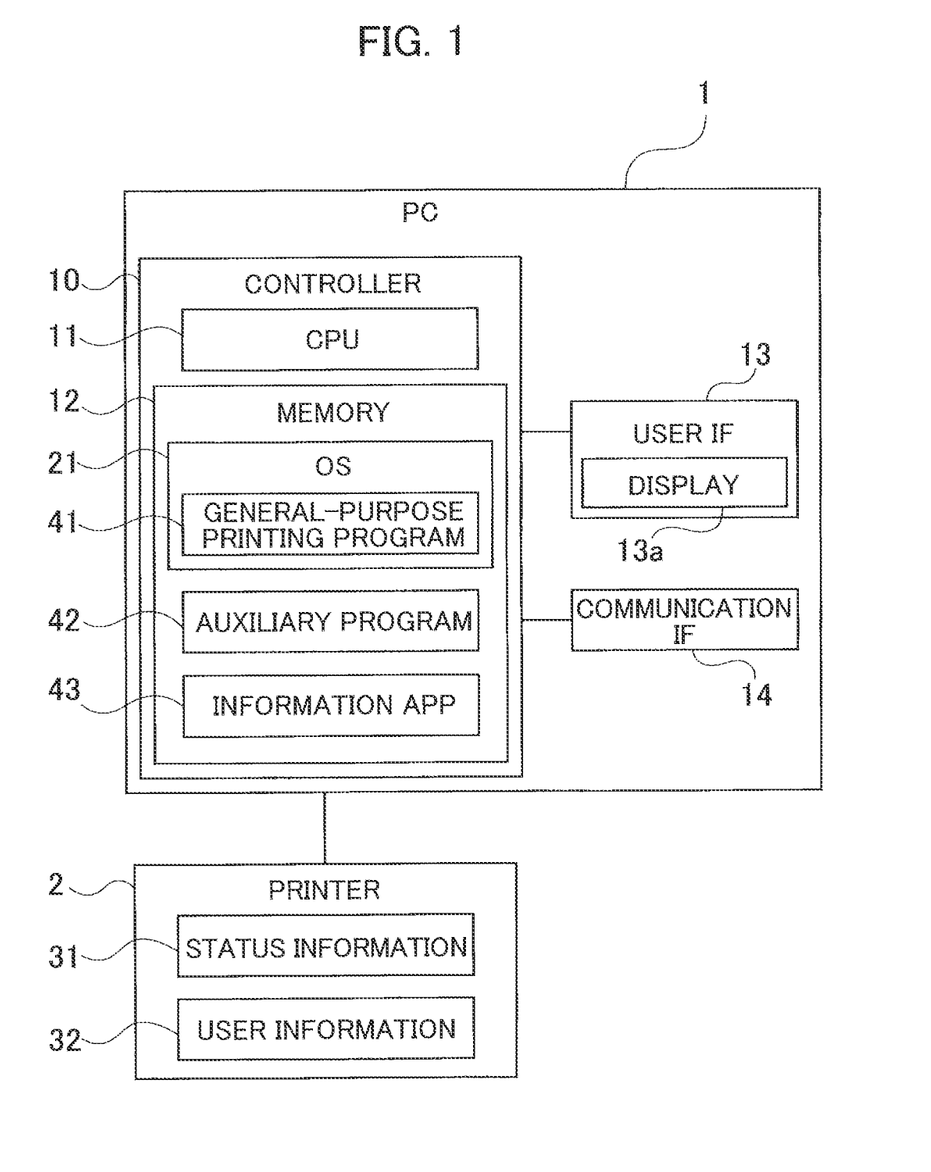
FIG. 1 is a block diagram illustrating the schematic electrical configuration of a personal computer.

As illustrated in FIG. 1, the PC 1 of this embodiment is provided with a controller 10 that includes a CPU 11 and a memory 12. The PC 1 is an example of the information processing device of the present disclosure. The CPU 11 is an example of the computer of the present disclosure. The PC 1 is also provided with a user interface (also described as "user IF") 13 and a communication interface (also described as "communication IF") 14, both of which are electrically connected to the controller 10. Note that the controller 10 in FIG. 1 is a general concept that covers all hardware and software used for controlling the PC 1 and is not actually limited to a single piece of hardware present in the PC 1.

The CPU 11 executes various processes according to programs read from the memory 12 or based on user operations. The memory 12 stores various programs and various data. The memory 12 is also used as a work area for executing various processes. Examples of the memory 12 may be a ROM, a RAM, a hard disk drive, and the like built into the PC 1 or may be any storage medium that is readable and writable by the CPU 11, such as a CD-ROM, a DVD-ROM, or other storage media. A buffer provided in the CPU 11 is another example of the memory.

The user interface 13 includes hardware that displays screens for reporting information to the user, and specifically a display 13a, and hardware that receives operations performed by the user. The user interface 13 may be a set of devices that includes the display 13a for displaying information, and a mouse, keyboard, and the like with input-receiving functions. Alternatively, the user interface 13 may be a touchscreen that is provided with both the display 13a and an input-receiving function.

The communication interface 14 includes hardware for communicating with an external device, such as a printer 2. The communication standard employed by the communication interface 14 may be Ethernet (registered trademark), Wi-Fi (registered trademark), Universal Serial Bus (abbreviated "USB"), or the like. "Ethernet" is a Japanese registered trademark of FUJIFILM Business Innovation Corp. "Wi-Fi" is a Japanese registered trademark of Wi-Fi Alliance. The PC 1 may be capable of connecting to the Internet via the communication interface 14. Alternatively, the PC 1 may be provided with a plurality of communication interfaces 14 supporting a plurality of communication standards.

As illustrated in FIG. 1, the memory 12 of the PC 1 stores an operating system (hereinafter abbreviated "OS") 21, an auxiliary program 42, and various application programs (hereinafter abbreviated "apps"). The OS 21 includes a general-purpose printing program 41. The OS 21 is one of Windows (registered trademark), macOS (registered trademark), Linux (registered trademark), iOS (registered trademark), and Android (registered trademark), for example. "Windows" is a Japanese registered trademark of Microsoft Corporation. "macOS" is a Japanese registered trademark of Apple Inc. "Linux" is a Japanese registered trademark of Linus Torvalds. "iOS" is a Japanese registered trademark of Cisco Technology Inc. "Android" is a Japanese registered trademark of Google Inc. The auxiliary program 42 is an example of the support program of the present disclosure.

Among the various apps installed on the PC 1 of the present embodiment is an information app 43. The information app 43 is a map app, calendar app, or a browser, for example. The information app 43 has a function for displaying various information on the display 13a in response to user requests. The information app 43 is an example of the application program of the present disclosure. The information app 43 itself may also be provided with a function for printing displayed information.

The general-purpose printing program 41 is an OS-standard program provided together with the OS 21 and functions to print on the printer 2 or the like information displayed on the display 13a by the information app 43 and the like. The general-purpose printing program 41 in the present embodiment includes a function for generating intermediate image data based on the image data to be printed. The general-purpose printing program 41 supports functions that are universally available on printers of a plurality of models provided by various printer vendors. Unlike printer drivers designed for specific types of printers, the general-purpose printing program 41 does not support all functions that are specific to all of the various printers, but rather limits support to general functions available on all printers.

The auxiliary program 42 is a program or a set of programs that executes processes based on commands from the OS 21 in conjunction with processes of the general-purpose printing program 41 and provides control support for the target hardware. The auxiliary program 42 of the present embodiment supports the model of printer 2 connected to the PC 1. The auxiliary program 42 is started from the general-purpose printing program 41 when the OS 21 receives a command to execute a print on the printer 2 using the general-purpose printing program 41, for example. The auxiliary program 42 is called a Print Support Application (abbreviated "PSA") or a Hardware Support Application (abbreviated "HSA").

The auxiliary program 42 may be a combination of programs, each of which receives execution instructions, or may be a single program that can execute different processes according to the received instructions. The vendors of printers may prepare an auxiliary program for each type of printer. For example, one auxiliary program may be prepared for inkjet printers and another auxiliary program may be prepared for laser printers. Alternatively, an auxiliary program may be prepared for each model of printer or for each model series rather than for each type of printer.

When a new printer is connected to the PC 1, for example, the OS 21 of the PC 1 can download the appropriate auxiliary program from a server or the like based on the type or model of the connected printer and can install this program on the PC 1. The OS 21 stores identification information for the installed auxiliary program in the memory 12 in association with printer information for the newly connected printer.

As illustrated in FIG. 1, the PC 1 in the present embodiment is connected to a printer 2. The printer 2 is a device that possesses at least a print function and a communication function.

In the present embodiment, the printer 2 stores status information 31 indicating the current status of the printer 2, and user information 32 specifying users that are permitted to use the printer 2. Statuses of the printer 2 are "ready," "printing," "error," and "warning," for example. "Ready" indicates that the printer 2 is waiting for a print job. "Error" indicates a state in which the printer 2 cannot print. "Warning" indicates a state in which the printer 2 can print but the user is cautioned that the printer 2 may soon be unable to print.

When the status of the printer 2 is either "error" or "warning," the status information 31 includes more detailed information. For example, when the status is "error," the status information 31 may include such detailed information as type information indicating the type of error (error type), guidance information indicating how the error can be resolved, and contact information indicating the contact person in charge. The type information may indicate error types such as "malfunction," "paper jam," "no paper," "no colorant," and "cover open." When the status is "warning," the type information included in the status information 31 specifies warning types such as "low colorant level," and "password unchanged." "Password unchanged" includes both the case in which the password has not been changed from the initial password and cases in which the same password has been used for a long time.

The user information 32 may be identification information specifying only those users permitted to use the printer 2 or may be information associating a list of users with information indicating whether each user is permitted to use the printer 2. The user information 32 may also specify the number of printable sheets and the available print settings for each user. When the printer 2 receives a print command from a user not permitted to use the printer 2 according to the user information 32, the printer 2 does not execute the print.

Next, a printing procedure including the operations of the auxiliary program 42 according to the present embodiment that is performed when "Print" has been selected in the information app 43 will be described with reference to the sequence chart of FIG. 2. Note that FIG. 2 and other sequence diagrams described later illustrate operations performed when an auxiliary program 42 compatible with the printer 2 is installed on the PC 1.

The processes in the present embodiment and process steps in the flowcharts essentially indicate processes performed by the CPU 11 according to instructions described in the auxiliary program 42 and other programs. Processes performed by the CPU 11 include hardware control using the API in the OS 21. However, a detailed description of the role of the OS 21 is omitted in this specification when describing operations in the programs. Further, "acquire" is used as a concept that does not necessarily require a request.

Figure 2:
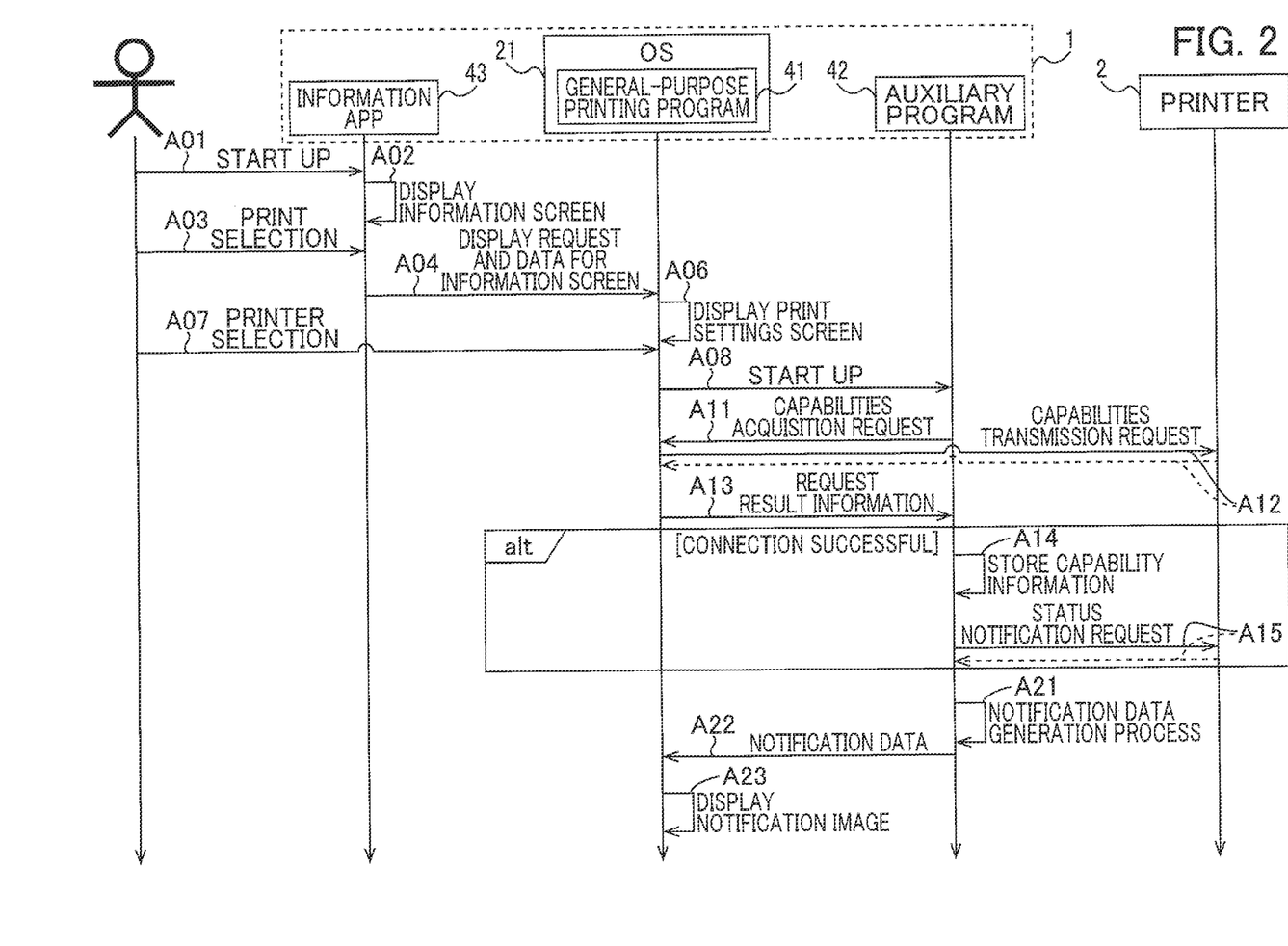
FIG. 2 is a sequence chart illustrating steps showing an example of an operating procedure performed when print has been selected.
Figure 3:
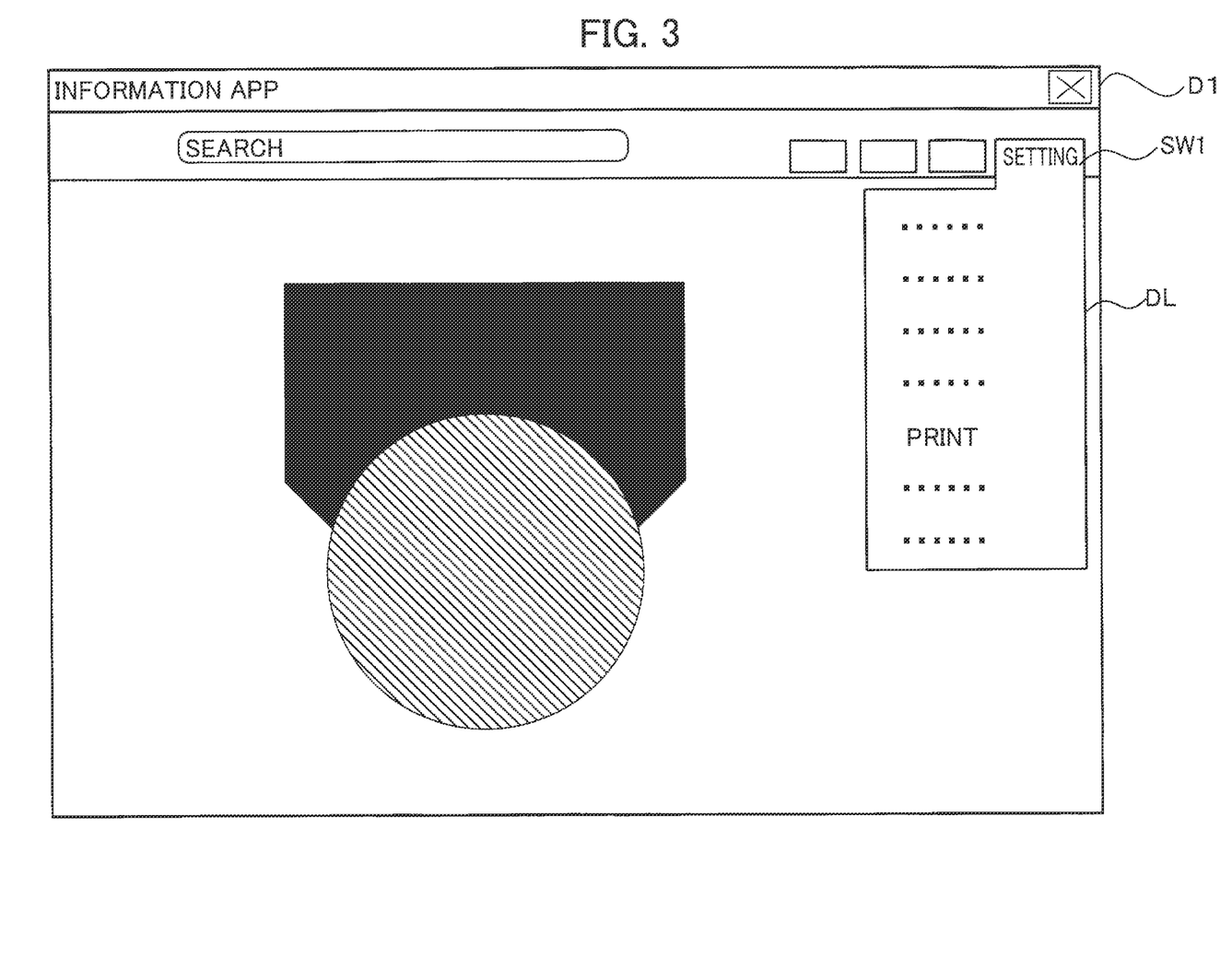
FIG. 3 is an explanatory diagram illustrating an example of an information screen.

In A01 at the beginning of the procedure in FIG. 2, the user starts up the information app 43. In A02 the information app 43 displays an information screen that includes various information on the display 13a in response to user instructions. When the user wishes to print an image of the information screen displayed on the display 13a, in A03 the user selects "Print" in the information screen. FIG. 3 illustrates an example of an information screen D1 that includes a Settings button SW1. When the user selects the Settings button SW1 through an operation, a pull-down menu DL that includes "Print" is displayed in the information screen D1, as illustrated in FIG. 3. When the user selects "Print" in the pull-down menu DL, in A04 the information app 43 passes a display request and data for the information screen to the general-purpose printing program 41 of the OS 21.

Figure 4:
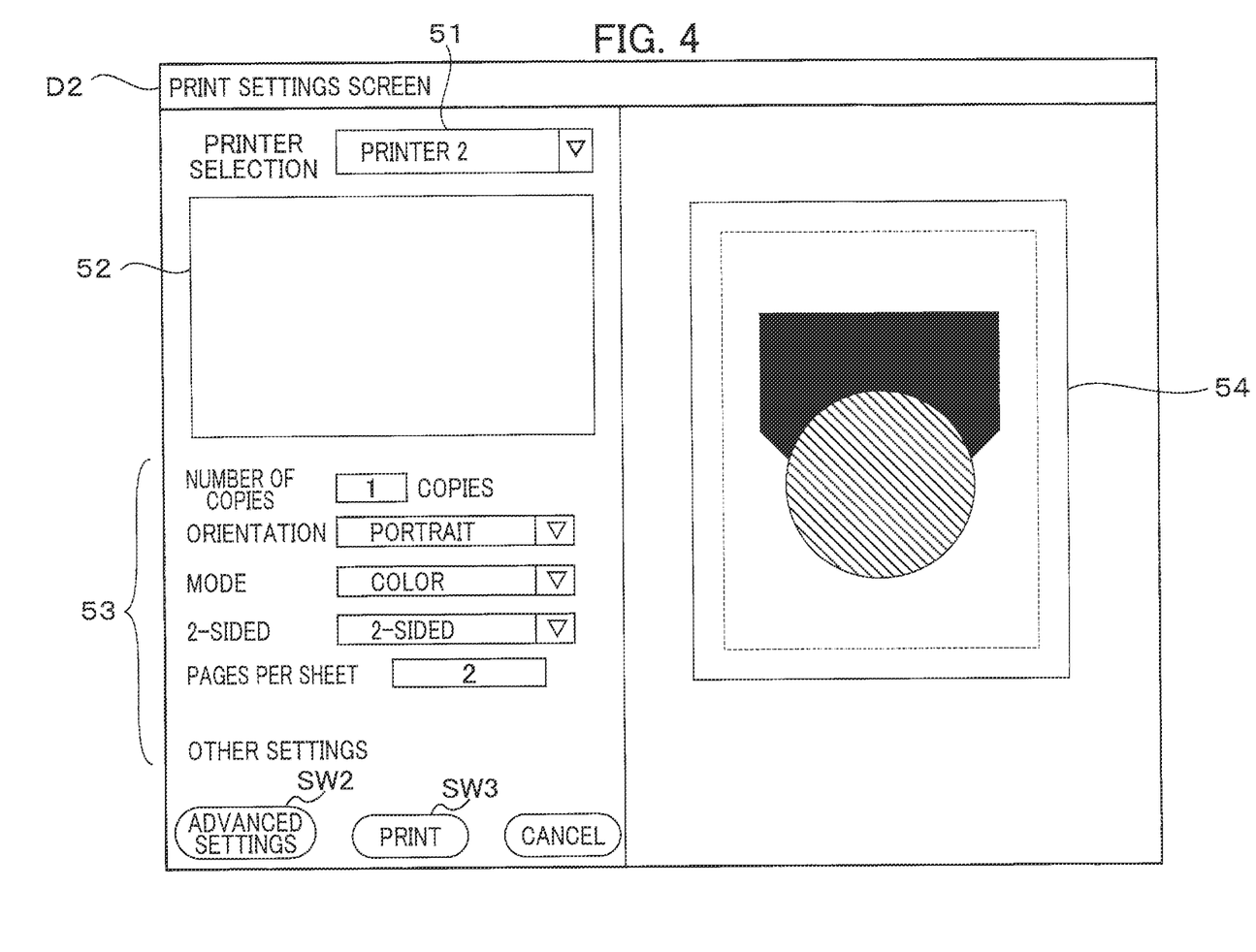
FIG. 4 is an explanatory diagram illustrating an example of a print settings screen.

In A06 the general-purpose printing program 41 displays a print settings screen on the display 13a in response to the request. Through the print settings screen, the general-purpose printing program 41 accepts commands to modify print settings and to execute a print. FIG. 4 illustrates an example of a print settings screen D2. The print settings screen D2 includes a printer selection menu 51 that receives a printer selection, a notification area 52 that displays a notification image, a print settings area 53 that accepts specifications for various print settings, a preview area 54 that shows an image of the information screen to be printed, an Advanced Settings button SW2 that accepts a command to perform advanced print settings, and a Print button SW3 that accepts a command to execute a print. The notification image displayed in the notification area 52 shows notification content of which the user is to be informed. The general-purpose printing program 41 can manage data for displaying the print settings screen D2.

In A07 the user can select a printer in the displayed print settings screen D2 through an operation on the printer selection menu 51. When the selected printer is the printer 2, in A08 the general-purpose printing program 41 starts up the auxiliary program 42 that supports the printer 2 and requests the auxiliary program 42 to perform a process corresponding to the printer selection. In A08 the general-purpose printing program 41 also passes to the auxiliary program 42 information on the selected printer and information on print settings that has been set when the printer is selected.

When the printer 2 has been set as the default printer of the OS 21, in A06 the general-purpose printing program 41 displays the print settings screen D2 with the printer 2 already selected, as illustrated in FIG. 4, and in A08 starts up the auxiliary program 42. In other words, the OS 21 automatically selects the printer 2, and the general-purpose printing program 41 executes the process of A08 based on information on the selected printer 2. In this case, the user operation in A07 is unnecessary.

Rather than the general-purpose printing program 41 displaying the print settings screen D2, the information app 43 may be configured to display the print settings screen D2. In this case, the information app 43 starts up the general-purpose printing program 41 in response to "Print" being selected in A03, acquires data for displaying the print settings screen D2 from the general-purpose printing program 41, and displays the print settings screen D2 on the display 13a. When the printer 2 has already been selected in the print settings screen D2 or when the printer 2 is selected in A07, the information app 43 passes information on the selected printer 2 to the general-purpose printing program 41. In this way, the general-purpose printing program 41 starts up the auxiliary program 42 supporting the printer 2 in A08.

Once the auxiliary program 42 is started up, in A11 the auxiliary program 42 outputs a capabilities acquisition request to the OS 21 requesting capability information for the printer 2. Upon receiving the capabilities acquisition request from the auxiliary program 42, in A12 the OS 21 transmits a capabilities transmission request to the printer 2 requesting capability information and receives a reply from the printer 2. When the printer 2 receives a capabilities transmission request from the general-purpose printing program 41 of the OS 21, the printer 2 transmits capability information indicating the capabilities of the printer 2 to the source of the request.

Capability information that can be acquired from the printer 2 includes information on the possible parameters that can be specified in print settings, as well as information on the residual quantities of consumables, information on mounted trays, paper information on the paper loaded in each tray, and information on supported print resolutions, for example. The printer 2 may also have functions to process images based on incoming print jobs and to execute a print based on the processed data. For example, the printer 2 may have functions to perform multiple page printing such as N-in-1 printing, composite printing with watermarks or the like, and economic printing for saving colorant. When the printer 2 possesses image processing functions that can be applied, the printer 2 may pass information on these functions to the OS 21 as capability information.

The OS 21 communicates with the printer 2 according to the Internet Printing Protocol (hereinafter abbreviated "IPP"), for example. Note that rather than sending a request to the OS 21, the auxiliary program 42 may acquire the capability information directly from the printer 2 using a management information base (abbreviated "MIB"), for example.

In A13 the general-purpose printing program 41 of the OS 21 transfers request result information to the auxiliary program 42 based on the response to the capabilities acquisition request in A11. When a reply has been received from the printer 2, the general-purpose printing program 41 transmits information received in the reply from the printer 2 to the auxiliary program 42 as the request result information. For example, when the information received from the printer 2 is suitable capability information, the auxiliary program 42 can acquire this capability information from the request result information received from the general-purpose printing program 41 in A13. The auxiliary program 42 determines whether suitable capability information has been acquired on the basis of the request result information received in A13.

When the auxiliary program 42 determines that suitable capability information has been acquired from the printer 2 (alt: CONNECTION SUCCESSFUL), in A14 the auxiliary program 42 stores the capability information received from the OS 21 in a prescribed area of the memory 12 that is accessible to the auxiliary program 42. When capability information has already been stored in the memory 12, the auxiliary program 42 overwrites the stored capability information with the new capability information.

In A15 the auxiliary program 42 further requests the printer 2 for a status notification and acquires the status information 31 from the printer 2 in response. The auxiliary program 42 acquires the status of the printer 2 based on the status information 31 received from the printer 2.

The status information 31 may also be included in the capability information. In this case, the auxiliary program 42 can acquire the status information 31 from the capability information received in A13. When the status information 31 is included in the capability information, the auxiliary program 42 need not issue the request in A15. Further, rather than directly requesting the status information 31 from the printer 2, the auxiliary program 42 may request the OS 21 to acquire the status information 31 by issuing a separate request from the request for capability information.

The process of acquiring the status information 31 is simpler when the auxiliary program 42 acquires the status information 31 directly from the printer 2 than when the auxiliary program 42 acquires the status information 31 together with the capability information since the auxiliary program 42 need not extract the status information 31 from the capability information in the former case. Further, since the auxiliary program 42 can acquire the status information 31 at a timing different from the timing for acquiring the capability information, the auxiliary program 42 has more flexibility in the timing at which the status information 31 is acquired. By contrast, when the general-purpose printing program 41 is requested to acquire the status information 31 from the printer 2 together with the capability information, the processing load on the PC 1 for communicating with the printer 2 is less than if the status information 31 were acquired separately from the capability information.

On the other hand, the request result information passed from the general-purpose printing program 41 to the auxiliary program 42 in A13 may not contain suitable capability information. For example, when the state of communication between the PC 1 and printer 2 is poor, the general-purpose printing program 41 cannot receive information from the printer 2. The printer 2 may not receive the request from the PC 1 when unable to communicate properly due to not being turned on, being offline, or being in communication with another device, for example. Moreover, the PC 1 cannot send a request to the printer 2 when a communication failure occurs or when the address for the printer 2 is unknown.

The OS 21 determines that a timeout has occurred when the OS 21 is unable to transmit a capabilities transmission request to the printer 2 in A12 or when a prescribed time has elapsed after transmitting the capabilities transmission request without having received a reply from the printer 2. In such cases, in A13 the general-purpose printing program 41 of the OS 21 transmits information indicating the timeout to the auxiliary program 42 as the request result information.

Additionally, when the printer 2 does not support communication by IPP or does not possess suitable capability information due to an outdated firmware version, for example, the printer 2 cannot reply to the request in A12 with information that includes suitable capability information. In such cases, the printer 2 may return capability information that includes version information. When the general-purpose printing program 41 of the OS 21 receives information from the printer 2, the general-purpose printing program 41 transmits the received information as request result information, regardless of its content.

Additionally, the capabilities acquisition request that the auxiliary program 42 transfers to the general-purpose printing program 41 in A11 of this embodiment may include commands for user authentication. In this case, the capabilities transmission request that the OS 21 transmits to the printer 2 in A12 includes the commands for user authentication and user information indicating the user who is currently logged in to the PC 1. When the printer 2 receives a capabilities transmission request that includes commands for user authentication, the printer 2 performs user authentication based on the user information 32 stored on the printer 2 and the user information included in the capabilities transmission request.

When the printer 2 determines that user authentication is successful, in A12 the printer 2 returns capability information to the OS 21, as described above. However, when the printer 2 determines that user authentication has failed, in A12 the printer 2 returns information indicating this authentication failure to the OS 21 in place of the capability information. The printer 2 also determines that authentication has failed when the user information 32 does not include information identifying the user currently logged in to the PC 1 or when the user identification information is included but the user is not authorized to connect to the printer 2.

Regardless of the authentication results, the general-purpose printing program 41 of the OS 21 transmits the information received from the printer 2 to the auxiliary program 42 as the request result information. Thus, the auxiliary program 42 can determine whether user authentication with the printer 2 has succeeded based on the request result information received in A13.

When determining on the basis of the request result information received in A13 that suitable capability information has not been able to be acquired from the printer 2, the auxiliary program 42 determines that a connection error has occurred and skips the processes in A14 and A15. Hence, the process of A11 in which the auxiliary program 42 requests the OS 21 for capability information of the printer 2 is a process for confirming that a proper connection is established with the printer 2. The process of A11 is an example of the (a) confirming of the present disclosure. The auxiliary program 42 also determines the cause of a connection error from the request result information received in A13. Some causes of connection errors are faulty communication, a firmware version error, and an authentication failure, for example.

In A21 the auxiliary program 42 executes a notification data generation process based on the status information 31 acquired in A15 or the request result information acquired in A13. In the notification data generation process, the auxiliary program 42 generates notification data representing a notification image to be displayed in the notification area 52 of the print settings screen D2. Notification images to be displayed in the notification area 52 may include one or a combination of text, a still image, a video, and an object having a link with an embedded URL, for example. The object may be displayed in the form of text, a button, or a banner. This notification data generation process will be described later in greater detail.

In A22 the auxiliary program 42 transfers display information including the generated notification data to the general-purpose printing program 41 and subsequently ends the process. When the auxiliary program 42 has been able to acquire suitable capability information, the auxiliary program 42 also transfers information on values of print settings based on the capability information to the general-purpose printing program 41. In A23 the general-purpose printing program 41 displays a notification image in the notification area 52 of the print settings screen D2 displayed on the display 13a based on the display information received from the auxiliary program 42. In addition to displaying the notification image in the notification area 52, in A23 the general-purpose printing program 41 displays information in the print settings area 53 indicating initial values of the print settings based on the capability information of the printer 2.

Note that when the information app 43 is configured to display the print settings screen D2, the information app 43 may receive the notification data in A22 and display the notification image in the notification area 52 in A23. Further, when the auxiliary program 42 has been unable to acquire suitable capability information due to a connection error with the printer 2, in A22 the auxiliary program 42 may transfer default information stored on the auxiliary program 42 as the initial values of the print settings.

FIG. 4 illustrates one example of a print settings screen D2 that includes a single notification area 52, but the arrangement, shape, size, number, and the like of the notification areas 52 is not limited to this example. The auxiliary program 42 may acquire information on the notification area 52 from the general-purpose printing program 41 and may set the notification data to be displayed in the notification area 52 based on the acquired information. When, for example, there are multiple layouts in which the notification area 52 can be displayed and the auxiliary program 42 can specify the display location, the auxiliary program 42 may transfer notification data that includes information specifying this display location to the general-purpose printing program 41. Further, when the size of the notification area 52 can be selected, the auxiliary program 42 may transfer information specifying this size to the general-purpose printing program 41.

Figure 5:
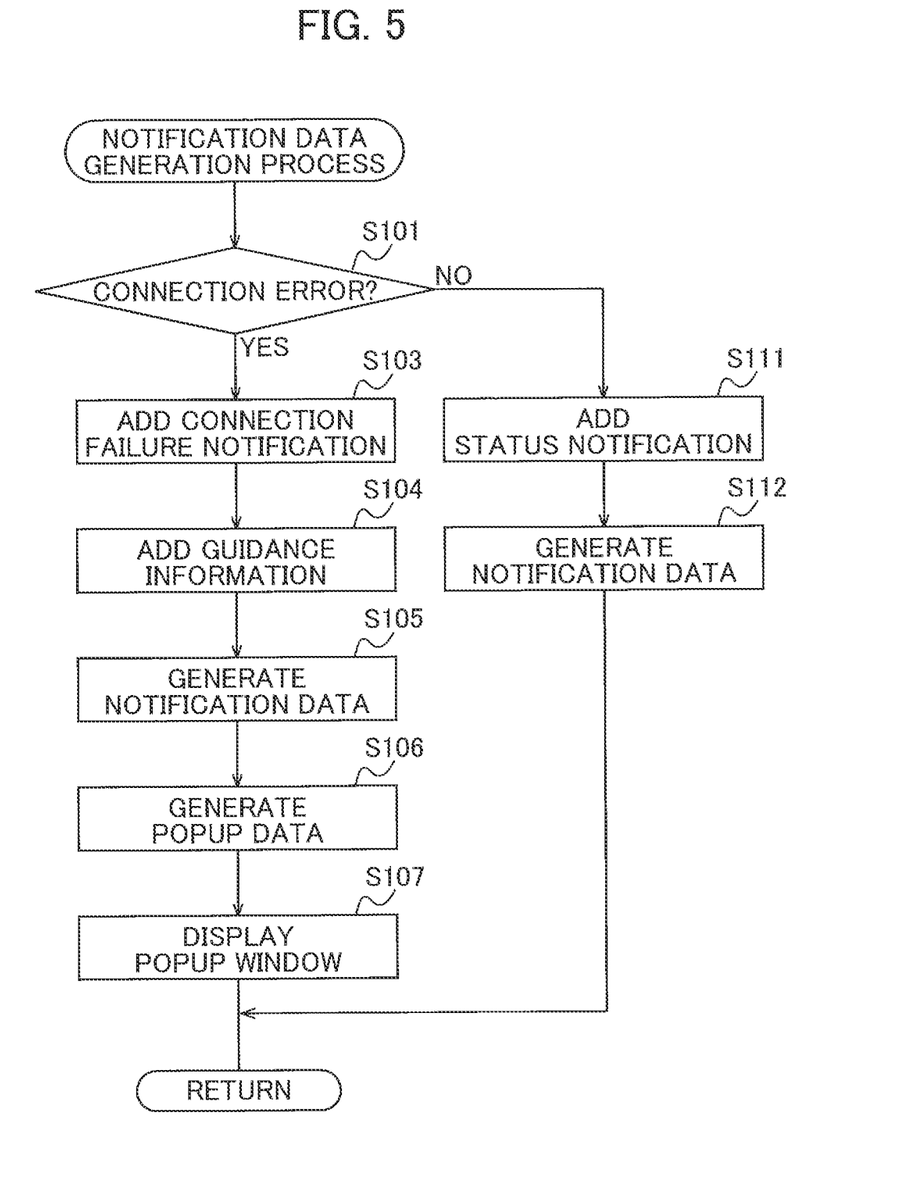
FIG. 5 is a flowchart illustrating steps in a notification data generation process.

Next, steps in the notification data generation process executed in A21 will be described with reference to the flowchart in FIG. 5. The CPU 11 of the PC 1 executes this notification data generation process based on the description in the auxiliary program 42.

In S101 at the beginning of the notification data generation process, the CPU 11 determines whether a connection error with the printer 2 has been confirmed on the basis of the request result information received in A13 of FIG. 2. When the CPU 11 determines that a connection error has been confirmed (S101: YES), in S103 the CPU 11 adds a connection failure notification to the notification content. The connection failure notification includes a message indicating that the PC 1 has failed to connect to the printer 2. The connection failure notification is an example of the failure information of the present disclosure.

In S104 the CPU 11 adds guidance information to the notification content specifying a procedure for resolving the connection error. The guidance information includes instructions to confirm the status of the printer 2, a message prompting the user to install a special program or to update the firmware, and contact information for the administrator who manages the user information, for example. The guidance information may be an image that includes an object having a link with an embedded URL for a web page showing how to connect the printer 2. If an object having a link with an embedded URL is displayed, the user can access the web page indicated by the URL by performing a simple operation on the object and can then learn the procedure for resolving the connection error from the displayed web page. By including the procedure for resolving connection errors in the notification content, the auxiliary program 42 facilitates the user in resolving the error quickly.

In S105 the CPU 11 generates notification data representing the image to be displayed in the notification area 52 based on the added notification content. The process of S105 is an example of the (b) generating of the present disclosure. The notification data generated in S105 is an example of the first notification data and the notification data of the present disclosure. As indicated in A22 of FIG. 2, the auxiliary program 42 passes this generated notification data to the general-purpose printing program 41. As a result, a notification image including a connection failure notification and guidance information is displayed in the notification area 52 of the print settings screen D2 in A23 of FIG. 2. In other words, an image is displayed in the print settings screen D2 on the basis of notification data generated by the auxiliary program 42. In this case, the process of A22 is an example of the (c) transferring of the present disclosure.

In S106 the CPU 11 also generates popup data for displaying the notification content in a popup window for notifying the user that a connection error has been confirmed. The process of S106 is an example of the (b) generating of the present disclosure. The popup data may be the information added to the notification content in S103 and S104, i.e., the same information displayed in the notification area 52 on the print settings screen D2 or may simply be a message or image to alert the user. In S107 the CPU 11 displays the popup window on the display 13a based on the popup data generated in S106. The process of S107 is an example of the (d) displaying and the (c) transferring of the present disclosure.

Figure 6:
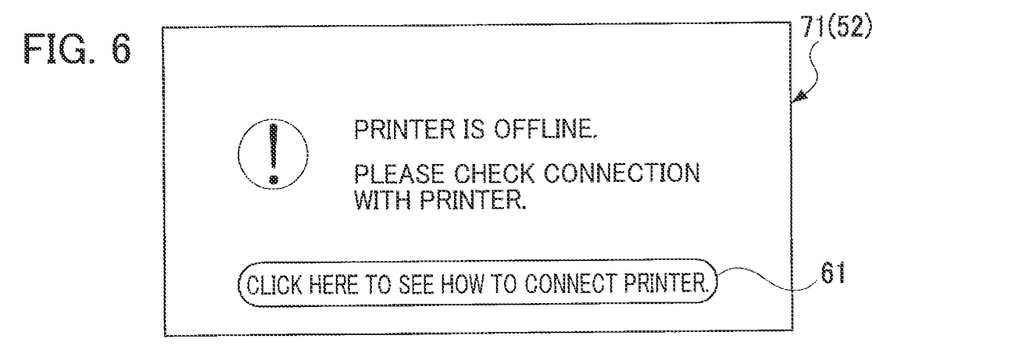
FIG. 6 is an explanatory diagram illustrating an example of a popup window.

FIG. 6 illustrates a sample popup window 71. The popup window 71 in this example includes a message specifying that a connection error has occurred due to faulty communication, and a button 61 having a link with an embedded URL for a web page showing how to connect the printer 2. When a connection error occurs, the popup window 71 is displayed separately from the currently displayed print settings screen D2 for better conveying to the user that the connection with the printer 2 has failed. In the example of FIG. 6, the same image displayed in the notification area 52 of the print settings screen D2 is displayed in the popup window 71.

On the other hand, when the CPU 11 determines that a connection error has not occurred (S101: NO), i.e., when the CPU 11 has acquired suitable capability information and the status information 31, in S111 the CPU 11 adds a status notification indicating the status of the printer 2 to the notification content based on the status information 31 acquired in A15. For example, when an error has occurred in the printer 2, a status notification including information on this error is added to the notification content. When the status is "error" or "warning," the auxiliary program 42 further adds detailed information about this error or warning to the notification content.

In S112 the CPU 11 generates notification data representing the image to be displayed in the notification area 52 based on the added notification content. The process of S112 is an example of the (e) generating of the present disclosure. The notification data generated in S112 is an example of the second notification data of the present disclosure. In this case as well, the auxiliary program 42 passes the generated notification data to the general-purpose printing program 41 in A22 of FIG. 2. As a result, a notification image indicating the status of the printer 2 is displayed in the notification area 52 of the print settings screen D2 in A23. In other words, an image is displayed in the print settings screen D2 based on the notification data generated by the auxiliary program 42. In this case, the process of A22 is an example of the (f) transferring of the present disclosure.

Figure 7:
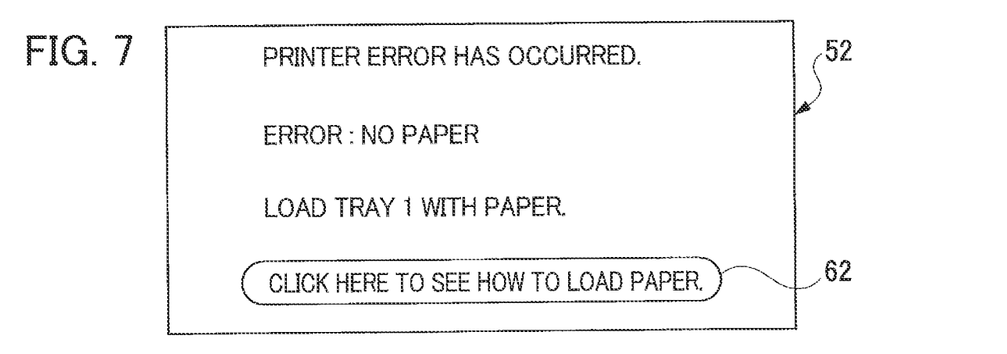
FIG. 7 is an explanatory diagram illustrating an example of a notification image.

FIG. 7 illustrates an example of a notification image displayed when the status of the printer 2 is "error." The notification image in this example of FIG. 7 is used when a "no paper" error has occurred and includes a button 62 having a link with an embedded URL to a web page showing how to load the paper. When the CPU 11 displays a notification image in the notification area 52 of the print settings screen D2 including a message indicating the error, the user can easily understand through the print settings screen D2 that an error has occurred in the printer 2.

Figure 8:
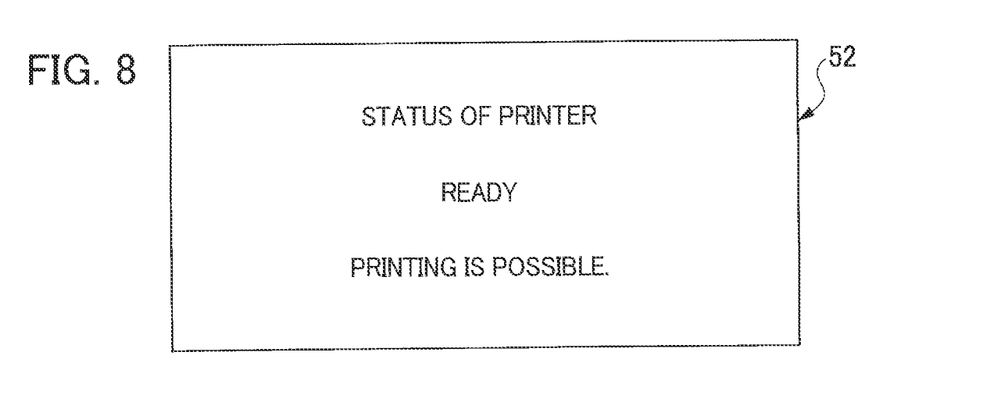
FIG. 8 is an explanatory diagram illustrating another example of the notification image.

FIG. 8 illustrates an example of a notification image displayed when the status of the printer 2 is neither "error" nor "warning." The notification image in this example of FIG. 8 is used when the status of the printer 2 is "ready." When the CPU 11 displays a notification image in the notification area 52 of the print settings screen D2 including this status information, the user can easily understand through the print settings screen D2 that printing with the printer 2 is possible.

The status notification added in S111 is not limited to the status of the printer 2 but may include information about services enabled on the printer 2, information on services available to the printer 2 that have not been enabled, and advertisements for models other than the printer 2, for example. When a plurality of notifications has been added, the CPU 11 may prioritize notifications based on an order of priority stored in the auxiliary program 42, for example, so that notifications with a higher priority are given precedence in the display over notifications with a lower priority. Alternatively, the CPU 11 may generate notification data representing an animated display that sequentially switches among notifications in the notification content.

When there are no notifications to be provided, the CPU 11 may generate notification data in which the notification area 52 is blank or may generate notification data showing a prepared image such as the logo of or latest information on the vendor. After completing S107 or S112, the CPU 11 ends the notification data generation process and returns to the process in the sequence chart of FIG. 2.

Figure 9:
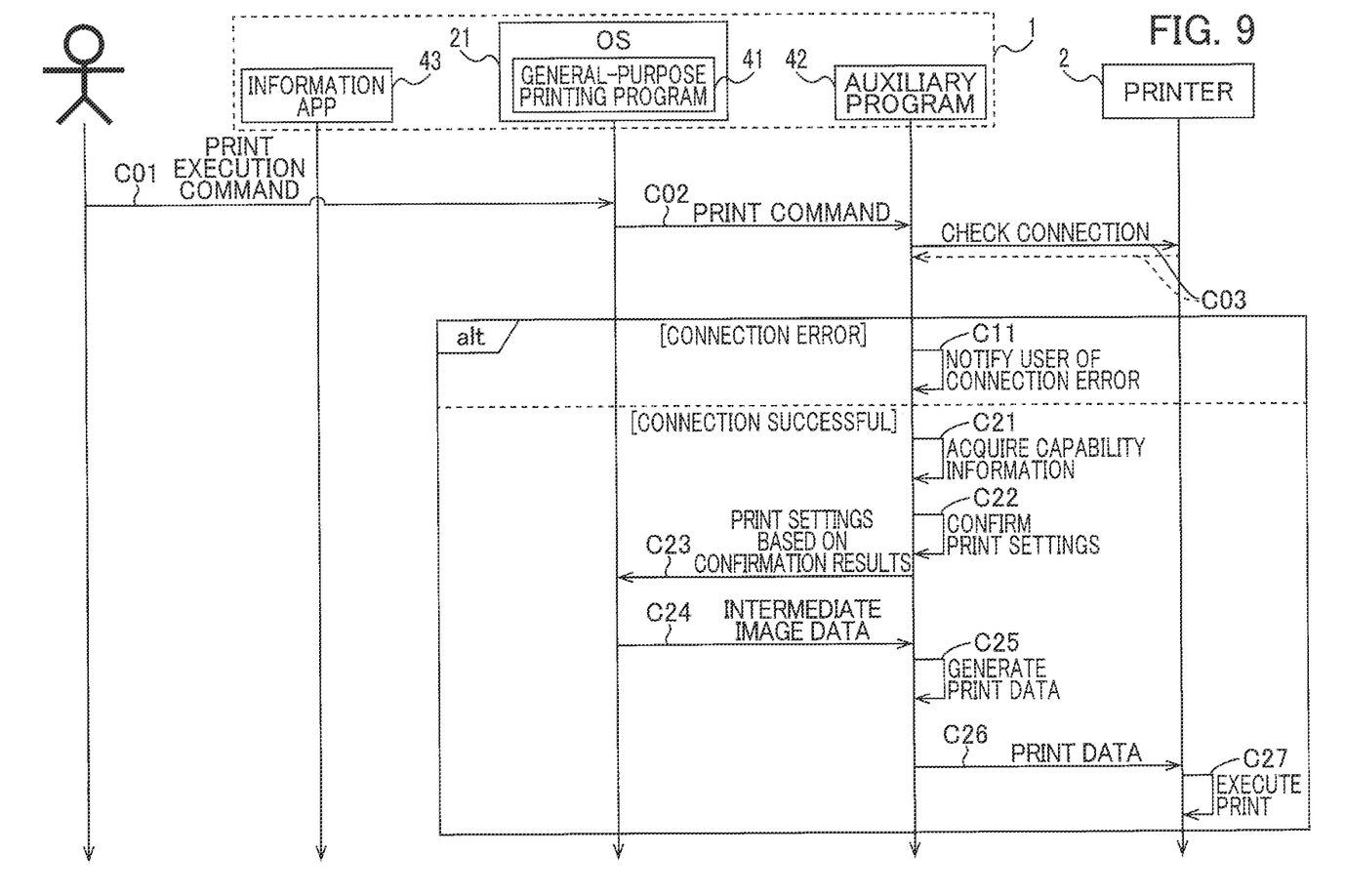
FIG. 9 is a sequence chart illustrating steps showing an example of an operating procedure performed when a print execution command is received.

Next, the procedure performed by each program when the OS 21 receives a command to execute a print (print execution command) through a user operation on the Print button SW3 in the print settings screen D2 displayed on the display 13a will be described with reference to the sequence chart in FIG. 9. The user may directly input the print execution command in the general-purpose printing program 41 or may input the print execution command in the information app 43, and the information app 43 may output a print command to the general-purpose printing program 41.

When the general-purpose printing program 41 receives the print execution command from the user in C01, in C02 the general-purpose printing program 41 starts up the auxiliary program 42 and issues a request to the auxiliary program 42 to perform a process corresponding to the print execution command. In C02 the auxiliary program 42 also receives information from the general-purpose printing program 41 indicating the print settings that have been set at the time of receipt of the print execution command. The general-purpose printing program 41 may also pass image data representing the image to be printed to the auxiliary program 42. The general-purpose printing program 41 also closes the currently displayed print settings screen D2, thereby making the information screen of the information app 43 active.

Upon receiving the print command, in C03 the auxiliary program 42 checks the connection with the printer 2. For example, the auxiliary program 42 issues a request to the printer 2 for the status information 31 and determines whether suitable status information 31 has been able to be received from the printer 2. The process of C03 is an example of the (g) confirming and the (d) confirming of the present disclosure. Note that rather than issuing a direct request to the printer 2 for the status information 31, the auxiliary program 42 may request the OS 21 to acquire the status information 31.

When a connection error has been confirmed in C03 (alt: CONNECTION ERROR), in C11 the auxiliary program 42 notifies the user of the connection error. The notification content may be the same as the content generated in S105 or S106 in the notification data generation process described above. When the print settings screen D2 has already been closed, the auxiliary program 42 may display the notification in a popup window or output a warning sound, for example, rather than redisplaying the print settings screen D2 and including the notification image in the notification area 52.

By checking the connection when a print command is received and notifying the user when a connection error has occurred, the CPU 11 enables the user to recognize that a print based on that print command cannot be performed. The auxiliary program 42 may be configured to check the connection in C03 only in cases when a connection error has been confirmed in A13 of FIG. 2. After notifying the user of the connection error in C11, the auxiliary program 42 may notify the general-purpose printing program 41 that the process has ended.

However, when the connection has been successful in C03 (alt: CONNECTION SUCCESSFUL), in C21 the auxiliary program 42 acquires capability information for the printer 2 that has been stored in A14 of FIG. 2. The auxiliary program 42 may also request capability information for the printer 2 together with the status information 31 in C03. The capability information includes information on image processing available on the printer 2, for example. In C22 the auxiliary program 42 checks the information on the print settings received in C02 on the basis of the capability information acquired in C21. In C22, for example, the auxiliary program 42 confirms whether there are any discrepancies between the print settings and the capabilities of the printer 2. In C23 the auxiliary program 42 transfers information on the print settings based on the confirmation results to the general-purpose printing program 41.

The auxiliary program 42 may also modify the print settings based on the confirmation results of C22 before transferring the settings in C23. For example, if the print settings received in C02 include information on image processing that is more preferably performed on the printer 2 than by the general-purpose printing program 41 or auxiliary program 42, the auxiliary program 42 may modify the print settings to exclude that image processing. In such cases, the auxiliary program 42 may store information on the excluded print settings so that these print settings can be transferred to the printer 2 in a later step and in C23 may transfer information on the modified print settings to the general-purpose printing program 41.

In C24 the general-purpose printing program 41 uses the print settings received from the auxiliary program 42 to generate intermediate image data by converting the format of image data for the image being printed to the format of the intermediate image data and transfers this intermediate image data to the auxiliary program 42. The process of C24 is an example of the (i) acquiring and the (f) acquiring of the present disclosure. Since the information app 43 includes image data of various types, the general-purpose printing program 41 converts the image data to be printed to intermediate image data that is suitable for generating print data. When the image data to be printed is already suitable for generating print data, the general-purpose printing program 41 may skip the process to generate intermediate image data and may use the image data itself as the intermediate image data. One example of intermediate image data is XPS data.

In C25 the auxiliary program 42 executes rasterization based on the intermediate image data received in C24 to generate print data representing the image to be printed. The print data generated in C25 is in a format that the printer 2 can use for printing, such as page description language (abbreviated "PDL") data specific to the model of printer 2.

Since the auxiliary program 42 is designed to support the printer 2, the auxiliary program 42 has a higher degree of freedom in rasterization than the general-purpose printing program 41 and can more likely generate print data suited for printing on the printer 2. Note that the print data generated by the auxiliary program 42 may be of a format that can be used for printing on printer models other than the model of the printer 2.

In C26 the auxiliary program 42 transmits the print data generated in C25 to the printer 2 together with a print command instructing the printer 2 to execute a print. The process of C26 is an example of the (j) transmitting and the (g) transmitting of the present disclosure. When the auxiliary program 42 has determined in C22 that a printing process should be executed on the printer 2, the auxiliary program 42 generates a print command that includes information for this process. The auxiliary program 42 may also notify the general-purpose printing program 41 when transmission of the print data is complete.

Upon receiving the print data and print command, in C27 the printer 2 prints an image of the print data based on the received print command, thereby generating printed matter.

The print data may be generated by the general-purpose printing program 41 rather than the auxiliary program 42. For example, the auxiliary program 42 may transfer the intermediate image data received in C24 and information on executing a print to the general-purpose printing program 41, and the general-purpose printing program 41 may generate print data by rasterizing the intermediate image data. In this case, the general-purpose printing program 41 transfers the generated print data to the auxiliary program 42. Upon receiving print data from the general-purpose printing program 41, the auxiliary program 42 transmits the print data to the printer 2 together with a print command instructing the printer 2 to execute a print.

Print data generated by the general-purpose printing program 41 is data in an image format that various printers can use for printing, such as PWG Raster data or PDF data. Performing rasterization on the general-purpose printing program 41 reduces the processing load on the auxiliary program 42, thereby avoiding an increase in processing time and reducing the size of the auxiliary program 42.

The general-purpose printing program 41 may also transmit the print data and print command to the printer 2. That is, the auxiliary program 42 may transfer the generated print data to the general-purpose printing program 41 to be sent from the PC 1 with the printer 2 as the destination. In this case, the general-purpose printing program 41 transmits the print data and the like received from the auxiliary program 42 to the printer 2. In this case, the process that the auxiliary program 42 transfer the print data and the like to the general-purpose printing program 41 is an example of the (j) transmitting and the (g) transmitting of the present disclosure.

As described above, the auxiliary program 42 of the present embodiment checks the connection with the printer 2 when the printer 2 is selected via the general-purpose printing program 41 and, when a connection error is confirmed, transfers notification data to the general-purpose printing program 41 for displaying a notification on the print settings screen D2. Accordingly, the user of a PC 1 employing the general-purpose printing program 41 of the OS 21 can learn the connection status with the printer 2 before issuing a print command.

Further, rather than just displaying a notification image in the notification area 52 of the print settings screen D2 when a connection error has been confirmed, the auxiliary program 42 of the present embodiment also displays a notification in a popup window so that the user can easily recognize that a connection error has occurred. Although the notification is displayed in both the notification area 52 and a popup window in the example of the embodiment, the notification may be displayed just in a popup window and not in the notification area 52. Alternatively, the user may be able to select whether to display notifications in the notification area 52 or in a popup window.

Further, since the auxiliary program 42 in the present embodiment checks the printer connection when a print command has been issued and notifies the user when a connection error is confirmed, the user can easily recognize when a connection error has occurred.

The embodiments disclosed in this specification are merely examples and are not intended to limit the present invention in any way. Therefore, it would be apparent to those skilled in the art that various improvements and modifications may be made to the technology disclosed in this specification without departing from the spirit of the disclosure. For example, the device connected to the PC 1 is not limited to a printer, but may be a multifunction peripheral, a copier, a fax machine, or any other device having a printing function. Further, the number of devices connected to the PC 1 may be any number of two or greater and is not limited to the example illustrated in the drawings.

The images illustrated in FIGS. 6 through 8 are merely examples, and the present disclosure is not limited to these sample images. Further, any of various wordings, object shapes, backgrounds, and the like may be displayed in the notification image and popup window.

Further, the auxiliary program 42 may check the printer connection at a timing other than the timing described in the embodiment. For example, the auxiliary program 42 may check the connection with the printer 2 through direct communication after the general-purpose printing program 41 has been started in A08 of FIG. 2 and before transferring a capabilities acquisition request to the general-purpose printing program 41 in A11.

The general-purpose printing program 41 may start up the auxiliary program 42, even when instructions are received in the print settings screen D2 to modify print settings. In this case, the auxiliary program 42 may confirm the connection with the printer 2 upon startup. Alternatively, the auxiliary program 42 may also check the printer connection when started up as a result of the general-purpose printing program 41 receiving a command to modify print settings or a command to execute a print in a case where a connection error with the printer 2 has been determined as a result of the printer connection being checked in response to the printer 2 being selected in the printer selection menu 51.

The general-purpose printing program 41 may also start up the auxiliary program 42 when the OS 21 changes the default printer from another printer to the printer 2 in response to the user performing an operation after the general-purpose printing program 41 displays the print settings screen D2. In this case, the auxiliary program 42 may execute the notification data generation process and transfer notification data to the general-purpose printing program 41 as when the printer 2 is selected in the above embodiment.

In the embodiment described above, only printing operations have been described in detail as the operations of the auxiliary program 42, but the auxiliary program 42 may have other roles. Further, the program that executes the processes described in the embodiment is not limited to the auxiliary program 42 but may be another program that receives instructions from the OS 21 or the general-purpose printing program 41 when printing is performed using the general-purpose printing program 41. For example, a print workflow application program having specifications published by Microsoft Corporation may be used as the program.

The execution timing of the auxiliary program 42 is not limited to the examples in the embodiment. For example, the auxiliary program 42 may be executed in response to execution instructions received directly from the OS 21. Alternatively, the auxiliary program 42 may be a resident program, in which case the auxiliary program 42 may perform the operations described above upon receiving an execution command.

In any of the sequence charts and flowcharts disclosed in the embodiments, the plurality of processes that make up any of the plurality of steps may be executed in parallel, or the order in which the processes are performed may be modified in any way that does not produce any inconsistencies in the processes.

The processes disclosed in the embodiment may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A non-transitory computer-readable storage medium storing a support program for an information processing device connectable to a printer, the information processing device including: a display; a computer; a communication interface for communicating with an external device; and a memory storing an operating system in which a general-purpose printing program is embedded, the general-purpose printing program being configured to manage data for displaying a print settings screen on the display, the support program corresponding to the printer and supporting the general-purpose printing program, the support program, when executed by the computer, causing the information processing device to perform:

when a request to perform a process is issued from the general-purpose printing program to the support program in response to the printer being selected and before a print execution command is issued:
   (a) confirming whether a connection through the communication interface is established between the information processing device and the printer, wherein a particular communication through the communication interface between the information processing device and the printer is executed for the confirming;

when a connection error that the connection has failed is confirmed in the (a) confirming:
   (b) generating first notification data which conforms to the print settings screen to be managed by the general-purpose printing program and which indicates a first notification content for notifying a user of the connection error; and
   (c) transferring, to the general-purpose printing program, the first notification data generated in the (b) generating to cause the general-purpose printing program to manage the first notification data for displaying the first notification content on the print settings screen displayed on the display; and when a request to perform a process is issued from the general-purpose printing program in response to the print execution command issued from an application program stored in the memory and instructing the general-purpose printing program to cause the printer to print an image:
   (d) acquiring image data from the general-purpose printing program, the image data representing the image; and
   (e) controlling such that a print command instructing the printer to print the image is transmitted to the printer.

2. The non-transitory computer-readable storage medium according to claim 1, wherein the support program, when executed by the computer, causes the information processing device to further perform:

when the connection error is confirmed in the (a) confirming:
(f) displaying a popup window for notifying the user of the connection error on the display separately from the print settings screen.

3. The non-transitory computer-readable storage medium according to claim 1, wherein the support program, when executed by the computer, causes the information processing device to further perform:

when the connection error is not confirmed in the (a) confirming:
(g) generating second notification data which conforms to the print settings screen to be managed by the general-purpose printing program and which indicates a second notification content for notifying the user of information acquired from the printer; and
(h) transferring, to the general-purpose printing program, the second notification data generated in the (g) generating to cause the general-purpose printing program to manage the second notification data for displaying the second notification content on the print settings screen displayed on the display.

4. The non-transitory computer-readable storage medium according to claim 3,
wherein the (g) generating comprises:
(g-1) acquiring status information from the printer, the status information indicating a status of the printer;
(g-2) determining whether printing with the printer is possible using the status information; and
(g-3) generating, in response to determining that printing with the printer is impossible, the second notification data indicating the second notification content for notifying the user that printing with the printer is impossible.

5. The non-transitory computer-readable storage medium according to claim 1,
wherein in the (b) generating, the first notification content indicated by the first notification data includes failure information and guidance information, the failure information indicating the connection error, the guidance information specifying a procedure for resolving the connection error.

6. The non-transitory computer-readable storage medium according to claim 5,
wherein in the (b) generating, the guidance information includes an object having a link with an embedded URL for a web page, the web page including information on the procedure for resolving the connection error.

7. The non-transitory computer-readable storage medium according to claim 1, wherein the support program, when executed by the computer, causes the information processing device to further perform:

when a request to perform a process is issued from the general-purpose printing program in response to the print execution command issued from the application program stored in the memory and instructing the general-purpose printing program to cause the printer to print an image:
(i) confirming whether a connection through the communication interface is established between the information processing device and the printer; and
when a connection error that the connection has failed is confirmed in the (i) confirming:
(j) notifying the user of the connection error.

8. A non-transitory computer-readable storage medium according to claim 1,
wherein the (a) confirming includes sending a capabilities request from the support program to the general-purpose printing program for confirming whether a connection through the communication interface is established between the general-purpose printing program and the printer, and
wherein the (b) generating is performed when a connection error result is received by the support program indicating that the connection has failed in the (a) confirming.

* * * * *